(12) United States Patent
Vedantham et al.

(10) Patent No.: US 7,590,922 B2
(45) Date of Patent: Sep. 15, 2009

(54) POINT-TO-POINT REPAIR REQUEST MECHANISM FOR POINT-TO-MULTIPOINT TRANSMISSION SYSTEMS

(75) Inventors: Ramakrishna Vedantham, Irving, TX (US); David Leon, Irving, TX (US); Igor Curcio, Tampere (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 1043 days.

(21) Appl. No.: 10/903,489

(22) Filed: Jul. 30, 2004

(65) Prior Publication Data

US 2006/0023732 A1    Feb. 2, 2006

(51) Int. Cl.
*H03M 13/00* (2006.01)
(52) U.S. Cl. ...................................... 714/776
(58) Field of Classification Search .................. 714/776
See application file for complete search history.

(56) References Cited

U.S. PATENT DOCUMENTS 6,212,240 B1    4/2001   Scheibel, Jr. et al.

FOREIGN PATENT DOCUMENTS

WO    WO 03/105353    12/2003

OTHER PUBLICATIONS

"FLUTE—File Delivery Over Unidirectional Transport;" T. Paila et al; IETF Standard-Working-Draft, Internet Engineering Task Force, CH, vol. Rmt, No. 8, Jun. 5, 2004.
3GPP SA4 PSM Ad-Hoc #31, Montreal, Canada, May 17-21, 2004; Digital Fountain; "Raptor code specification for MBMS filed download".
M. Luby, et al.; "The Use of Forward Error Correction (FEC) in Reliable Multicast"; Dec. 2002.
M. Luby, et al.; "Forward Error Correction (FEC) Building Block"; Dec. 2002.
Amin Shokrollahi, Digital Fountain, Inc.; "Raptor Codes"; Jan. 13, 2004.
T. Paila, et al.; "FLUTE—File Delivery Over Unidirectional Transport"; Jun. 2004.
B. Adamson, et al.; "NACK—Oriented Reliable Multicast Protocol (NORM)"; Mar. 2003.
M. Luby; "Simple Forward Error Correction (FEC) Schemes"; Jun. 7, 2004.

*Primary Examiner*—Guy J LaMarre
(74) *Attorney, Agent, or Firm*—Alfred A. Fressola; Ware, Fressola, Van Der Sluys & Adolphson LLP (57) ABSTRACT

This invention relates to a method, system, transmitter, network element, receiver and software application for a system capable of point-to-multipoint transmission, where one or more data packets are transmitted from a transmitter to one or more receivers, where at least at one specific receiver of said receivers, a reception of repair data packets is required, where repair information is signaled to a repair server in order to trigger a transmission of the repair data packets, and where the repair information comprises information related to the number of transmitted data packets correctly received at the specific receiver. The system may for instance be the 3GPP Multimedia Broadcast Multicast System, the transmission of data packets may for instance be controlled by the File Delivery Over Unidirectional Transport protocol and the signaling of the repair information may for instance be controlled by the Hypertext Transfer Protocol.

29 Claims, 5 Drawing Sheets

POINT-TO-POINT REPAIR REQUEST MECHANISM FOR POINT-TO-MULTIPOINT TRANSMISSION SYSTEMS

FIELD OF THE INVENTION

This invention relates to a method, system, transmitter, network element, receiver and software application for a system capable of point-to-multipoint transmission.

BACKGROUND OF THE INVENTION

For point-to-multipoint services (also denoted as one-to-many services) over systems such as the Internet Protocol (IP) multicast, the IP Data Casting (IPDC) and the Multimedia Broadcast/Multicast Services (MBMS), file delivery such as for instance the download of multimedia files is an important service.

However, many of the features for delivering files over point-to-point protocols, such as for instance the File Transfer Protocol (FTP) and the Hypertext Transfer Protocol (HTTP), are problematic for point-to-multipoint scenarios. In particular, the reliable delivery of files, that is the guaranteed delivery of files, using similar point-to-point acknowledgement (ACK) protocols such as the Transport Control Protocol (TCP) is not feasible.

The Reliable Multicast Transport (RMT) Working Group of the International Engineering Task Force (IETF) is currently in the process of standardizing two categories of error-resilient multicast transport protocols. In the first category, reliability is implemented through the use of (proactive) Forward Error Correction (FEC), i.e. by sending a certain amount of redundant data that can help a receiver in reconstructing erroneous data; in the second category, reliability is implemented through the use of receiver feedback.

Asynchronous Layered Coding (ALC) is a protocol instantiation belonging to the first category, while the NACK-Oriented Reliable Multicast (NORM) protocol belongs to the second category. The access networks on which these protocols could be used include, but are not limited to, wireless multiple-access networks such as the Universal Mobile Telecommunications System (UMTS, including the Global System for Mobile Communications Evolution Radio Access Network (GERAN) and the UMTS Terrestrial Radio Access Network (UTRAN)), Wireless Local Area Networks (WLAN), Digital Video Broadcasting-Terrestrial (DVB-T) networks and Digital Video Broadcasting-Satellite (DVB-S) networks.

Briefly, the ALC protocol is a proactive FEC-based scheme that allows receivers to reconstruct mangled packets or packets that have not been received. The ALC protocol uses FEC encoding on multiple channels, allowing the sender to send data at multiple rates (channels) to possibly heterogeneous receivers. Additionally, the ALC protocol uses a congestion control mechanism to maintain different rates on different channels.

The ALC protocol is massively scalable in terms of the number of users because no uplink signaling is required. Therefore, any amount of additional receivers does not exactly put increased demand on the system. However, the ALC protocol is not 100% reliable because reception is not guaranteed, thus it is generally not described as robust.

NORM, in turn, specifies the use of Negative Acknowledgement (NACK) messages in order to signal which data packets expected to arrive at the receiver were not received at the receiver at all, or were received incorrectly. In other words, receivers employ NACK messages to indicate loss or damage of transmitted data packets to the transmitter. Accordingly, a receiver that missed some data packets from a data transmission can send a NACK message to the transmitter (or a repair server) requesting the transmitter (or repair server) to re-transmit the missed data block or blocks. The NORM protocol also optionally allows for the use of data packet-level FEC encoding for proactive robust transmissions.

NACK messages are not generally NORM-specific, but they can also be used in connection with other protocols or systems, for instance with systems that support sessions that are controlled by the File Delivery over Unidirectional Transport (FLUTE) protocol.

FLUTE is a one-to-many transport protocol that builds on FEC and ALC building blocks. It is intended for file delivery from transmitter(s) to receiver(s) over unidirectional systems. It has specializations which make it suitable to wireless point-to-multipoint systems. The details of the FLUTE protocol are discussed in more detail in the publication entitled "FLUTE—File Delivery over Unidirectional Transport" (Internet Draft) prepared by the above-mentioned RMT Working Group of the IETF.

The use of FLUTE is for instance specified by the Third Generation Partnership Project (3GPP) for file download in sessions of the MBMS system. FEC may or may not have been used in such FLUTE sessions. In any case, not all receivers in the session can be expected to receive the whole file when the session ends. To this end, 3GPP is in the process of defining point-to-point repair sessions, wherein the receivers are allowed to signal requests for data packet re-transmissions to a transmitter or repair server via NACK messages in order to be able to reconstruct the downloaded content.

When using NACK messages in connection with FLUTE sessions (or in other sessions using a transport layer protocol especially directed to support point-to-multipoint transmission) the identification of the data packets missing at the receivers is an important issue. The usage of protocols intended for point-to-point transmission, such as TCP, and their acknowledgement methods are not necessarily feasible here.

In a FLUTE session, transport objects, for instance multimedia files or parts thereof, are identified by a Transport Identifier (TOI), and are transmitted from a transmitter to a plurality of receivers within a transport session, which is identified by a Transport Session Identifier (TSI). The transmission of said transport objects is actually performed by the transmission of FLUTE data packets, wherein the FLUTE data packets contain raw or coded portions of said transport object, so-called encoding symbols, as payload. Said FLUTE data packets further contain the TSI and TOI as well as an FEC Payload ID, which will be explained below.

Various FEC schemes specified by the RMT working group are based on a source block and encoding symbol structure. Such FEC schemes are described in RFC publication 3452 "Forward Error Correction Building Block" and RFC publication 3695 "Compact Forward Error Correction (FEC) Schemes". Each encoding symbol can be identified by its Source Block Number (SBN) and its Encoding Symbol ID (ESI). All these FEC schemes assume that within each transport object, the SBN is sequentially increased by one, and that within a source block, the ESI is increased by one for each encoding symbol that is transmitted. Both SBN and ESI are contained in the FEC Payload ID that is contained in a FLUTE data packet.

In these FEC schemes, identification of FLUTE data packets that are not received at all or not received correctly at a receiver may be accomplished by their SBN and ESI, which are contained in the FEC Payload IF of FLUTE data packets. These parameters may then be signaled back as NACK to the transmitter to cause a re-transmission of these identified data packets.

However, publication "Simple Forward Error Correction (FEC) Schemes" (Internet Draft) by M. Luby introduces FEC schemes that use a simpler FEC Payload ID and can be used to deliver objects without using any explicit source block structure. These FEC Schemes may for instance use rate-less codes such as Luby Transform (LT) or Raptor codes.

An LT-encoder (see M. Luby, "LT-codes", in Proceedings of the ACM Symposium on Foundations of Computer Science (FOCS), 2002) transmits a stream of encoded bits, which are sparse random linear combinations of k data bits. The receiver picks up noisy versions of the encoded bits and uses a belief propagation decoder to try to figure out the k data bits. The number of noisy encoded bits n required for successful decoding depends on the quality and type of the channel. LT codes designed using the "robust soliton degree distribution" can achieve capacity on every binary erasure channel (BEC). In other words, R=k/n can be made arbitrarily close to (1−p) for every erasure probability p.

The key idea of Raptor Coding (see A. Shokrollahi, "Raptor codes", Digital Fountain, Inc., Tech. Rep. DF2003-06-001, June 2003) is to relax the condition that all input symbols need to be recovered. If an LT code needs to recover only a constant fraction of its input symbols, then its decoding graph need only have O(k) edges, allowing for linear time encoding. All input symbols can still be recovered by concatenating a traditional erasure correction code with an LT code. n intermediate symbols are then obtained by encoding k input symbols with an (k,n) erasure correcting block code capable of recovering all input symbols from a fixed fraction of intermediate symbols. The n intermediate symbols are then encoded with an LT code that can recover from its output symbols the required fraction of intermediate symbols.

The FEC Payload ID proposed for these FEC schemes consists of a 4 byte key from which the decoding graph is generated. The SBN is not included in this FEC Payload ID, and the ESI is meant to carry an identifier such as said 4 byte key in this case.

Moreover, the keys are randomly generated by the FEC encoder. Thus, the receiver may not be able to identify the missing data packets from the keys of the other data packets it has received in the session. As a result, identification of missing FLUTE data packets by their associated SBN and ESI is not applicable in these FEC schemes.

SUMMARY OF THE INVENTION

In view of the above-mentioned problems, there is a need for an improved method, system, transmitter, network element, receiver and software application for data packet transmission in a system capable of point-to-multi-point transmission.

It is proposed a method for transmitting data packets in a system capable of point-to-multipoint transmission, comprising transmitting one or more data packets from a transmitter to one or more receivers, wherein at least at one specific receiver of said receivers, a reception of repair data packets is required, and signaling repair information to a repair server in order to trigger a transmission of said repair data packets, wherein said repair information comprises information related to the number of transmitted data packets received correctly at said specific receiver.

Said system may represent any wireless or wire-bound system, wherein data packets are transmitted from at least one transmitter to one or more receivers. Said transmission may either be a broadcast transmission, in which all receivers are addressed by said transmitter, or a multicast transmission, in which only a sub-group of all receivers is addressed by said transmitter. Said system may for instance be deployed in the context of UMTS, a LAN, a WLAN, DVB-T or DVB-S, and may be intended to distribute content such as for instance multimedia files to a plurality of receivers. Said transmission of said one or more data packets may be performed on uni-directional or bi-directional transmission links.

Said transmitted data packets may for instance be related to content that is to be transferred to said receivers. This content may be segmented and processed to allow for the transmission to said receivers, whereas said data packets are to be understood as the result of this segmentation and processing. For instance, said data packets may be FLUTE data packets the payload of which are obtained by FEC encoding of a transport object, e.g. a multimedia file. In this case, said payload of said FLUTE data packet may for instance be encoding symbols or encoding packets.

At least at one receiver, which is denoted as specific receiver, a reception of repair data packets is required, which may be due to a plurality of reasons such as for instance incorrect reception or loss of transmitted data packets. Said specific receiver may become aware of the requirement to receive repair data packets during said transmission of data packets or after the transmission of data packets has finished.

Said repair data packets may for instance be simple copies of the transmitted data packets that were not received by said specific receiver. Equally well, they may be different with respect to both encoding and actual content. For instance, if rate-less FEC encoding is used, different keys may be applied when generating the repair data packets. Repair data packets thus serve the purpose of furnishing said specific receiver with that amount of information that is required by said specific receiver.

In order to trigger a transmission of repair data packets from said repair server, said specific receiver signals repair data information to said repair server. This may take place in a point-to-point transfer. The repair server thus is enabled to generate the appropriate repair data packets and to transmit them to the specific receiver. This transfer may for instance be a point-to-point transfer.

According to the present invention, it is proposed that this repair information comprises information related to a number of transmitted data packets that were correctly received at said specific receiver. Therein, the term correctly received is understood in a way that the receiver is able to use the information contained in said received data packet for further processing and does not have to discard the data packet. This may for instance be decided based on a checksum included in the data packet. The rationale behind this proposal is that, for certain FEC encoding techniques, which may be used to generate said data packets from a data object that is actually to be transferred in said point-to-multi-point transfer between said transmitter and said one or more receivers, the reception of a minimum number of data packets is sufficient to enable a receiver to reconstruct said data object itself. For instance, if a data object is encoded into N data packets, only L<N data packets may be required at a receiver to be able to reconstruct said data object. Therein, it may furthermore not be required that L specific data packets are received, but only that L different data packets out of the N data packets are received. Thus to enable a repair server to generate repair data packets, information on how many data packets were correctly received at said specific receiver, along with further structural information related to the FEC encoding technique, is sufficient.

In contrast to prior art, thus no longer an exact identification of the data packets that are required by said specific receiver, for instance in terms of an SBN and an ESI related to a certain transport object and a certain transport session, has to be signaled back to said repair server, which vastly reduces the signaling overhead encountered in repair sessions.

According to a preferred embodiment of the method of the present invention, said repair data packets are required due to loss or incorrect reception of at least one of said transmitted data packets at said specific receiver. This may for instance be caused by transmission channel attenuations, delays, distortions or additive noise. Equally well, some or all of said transmitted data packets may not have been received at said specific receiver at all.

According to a further preferred embodiment of the method of the present invention, said transmitted data packets are related to data objects. For instance, said data packets may contain portions of said data object in raw or encoded form.

According to a preferred embodiment of the method of the present invention, said repair data packets are required to reconstruct at least one of said data objects at said specific receiver. For instance, the case might occur that said transmitter terminates the transmission of data packets, before a specific receiver has received all the data packets it requires to reconstruct the entire transport object it is currently downloading. Then the data packets missing at said specific receiver may be data packets that actually have not been transmitted by said transmitter before.

According to a further preferred embodiment of the method of the present invention, said data objects are transport objects, and said repair information comprises an identifier of one of said transport object. Said transport objects may for instance be (multimedia) files or parts thereof.

According to a further preferred embodiment of the method of the present invention, said data objects are portions of transport objects, and said repair information comprises an identifier of one of said portions and an identifier of the corresponding transport object. Said transport objects may for instance be (multimedia) files that are downloaded by said receivers. Said transport objects may be segmented into portions, for instance source blocks of transport objects, which then represent said data objects. From said portions (source blocks), then said data packets may be generated, for instance by FEC encoding said source block into N data packets. It is then advantageous to provide an identifier of said portion (e.g. its SBN) and an identifier of the corresponding transport object (e.g. its TOI), so that a repair server, based on the information on how many data packets related to a transport object's source block are correctly received at said specific receiver, may determine how many repair data packets related to said source block of said transport object need to be transmitted to said specific receiver. It may also be possible that a transport object is segmented into several composite source block structures, and said identifier of said portion of said transport object then may identify one of said composite source block structures and the source block contained therein.

According to a further preferred embodiment of the method of the present invention, said transport objects are related to a transport session, and said repair information comprises an identifier of said transport session. A plurality of transport objects may be transmitted within the same transport session, and there may also be several concurrent transport sessions.

According to a further preferred embodiment of the method of the present invention, said repair information comprises the number of transmitted data packets correctly received at said specific receiver.

According to a further preferred embodiment of the method of the present invention, said repair information comprises the number of transmitted data packets not correctly received at said specific receiver. This number of not correctly received data packets is related to the number of correctly received data packets in so far as it can be determined from said number of correctly received data packets, if additionally the overall number of transmitted or required data packets is known to said specific receiver.

According to a further preferred embodiment of the method of the present invention, said data packets and said repair data packets are generated from said data objects by forward error correction encoding. Said data packets may for instance be generated by encoding said complete data object at once, or by encoding it piecewise. Therein, the term encoding is understood as any technique that adds redundancy to the raw data in order to simplify the detection and/or correction of corruptions of the encoded data due to corruptions introduced by a transmission channel.

According to a further preferred embodiment of the method of the present invention, said encoding is at least partially based on encoding keys that are included into said data packets and repair data packets. Said keys may be required to decode said data packets. Said keys may for instance be binary pseudo-random keys.

According to a further preferred embodiment of the method of the present invention, said forward error correction encoding has the property that only a sub-set of all transmitted data packets that are related to one data object have to be correctly received by a receiver in order to be able to reconstruct said data object. For instance, if N data packets are generated in the process of encoding said data object (or parts thereof), only L<N correctly received data packets may be required to reconstruct said data object (or the parts thereof). However, reception of additional data packets may contribute to increasing the quality of the reconstruction.

According to a further preferred embodiment of the method of the present invention, said repair server determines, at least partially based on said signaled repair information, how many repair data packets need to be transmitted to said specific receiver in order to enable it to reconstruct said data object, generates said repair data packets and transmits said repair data packets at least to said specific receiver. Said determination may for instance be based on the number of correctly received data packets signaled from the specific receiver, the size of said data object, for instance in terms of the number of portions said data object is segmented into, and parameters like the reception overhead, which denotes how many data packets exceeding the minimum amount of data packets required for proper reconstruction of the data object shall be provided to the receiver.

According to a further preferred embodiment of the method of the present invention, said forward error correction is at least partially based on an LT code.

According to a further preferred embodiment of the method of the present invention, said forward error correction is at least partially based on a raptor code.

According to a further preferred embodiment of the method of the present invention, said transmission of one or more data packets to one or more receivers is at least partially controlled by a session-based protocol directed to unidirectional point-to-multipoint transfer.

According to a further preferred embodiment of the method of the present invention, said transmission of one or more data packets to one or more receivers is at least partially controlled by the File Delivery Over Unidirectional Transport protocol. Then said data packets may for instance be protocol data units of the FLUTE protocol.

According to a further preferred embodiment of the method of the present invention, said signaling of said repair information is performed in a point-to-point session between said specific receiver and said repair server.

According to a further preferred embodiment of the method of the present invention, said signaling of said repair information is at least partially controlled by the Hypertext Transfer Protocol.

According to a further preferred embodiment of the method of the present invention, the GET or POST methods of the Hypertext Transfer Protocol are used for said signaling of said repair information.

According to a further preferred embodiment of the method of the present invention, said transmission of said repair data packets from said repair server to said specific receiver is performed in a point-to-point session.

According to a further preferred embodiment of the method of the present invention, said system is a Multimedia Broadcast/Multicast System according to the standards of the Third Generation Partnership Project.

It is further proposed a system for transmitting data packets, wherein said system is capable of point-to-multipoint transmission, comprising a transmitter, one or more receivers, and a repair server, wherein one or more data packets are transmitted from said transmitter to said receivers, wherein at least at one specific receiver of said receivers, a reception of repair data packets is required, wherein repair information is signalled to said repair server in order to trigger a transmission of said repair data packets, and wherein said repair information comprises information related to the number of transmitted data packets correctly received at said specific receiver.

It is further proposed a transmitter in a system capable of point-to-multipoint transmission, comprising means arranged for transmitting one or more data packets to one or more receivers, wherein at least at one specific receiver of said receivers, a reception of repair data packets is required, wherein repair information is signalled to a repair server in order to trigger a transmission of said repair data packets, and wherein said repair information comprises information related to the number of transmitted data packets correctly received at said specific receiver. Said transmitter may be co-located or even identical with said repair server.

According to a preferred embodiment of the transmitter of the present invention, said transmitted data packets are related to data objects, further comprising means arranged for generating said data packets from said data objects by forward error correction encoding.

It is further proposed a network element in a system capable of point-to-multipoint transmission, wherein one or more data packets are transmitted from a transmitter to one or more receivers, and wherein at least at one specific receiver of said receivers, a reception of repair data packets is required; said network element comprising means arranged for receiving repair information signaled to said network element in order to trigger a transmission of said repair data packets, wherein said repair information comprises information related to the number of transmitted data packets correctly received at said specific receiver. Said network element may be co-located or even identical with said transmitter, and may for instance be a repair server.

According to a preferred embodiment of the network element of the present invention, said transmitted data packets are related to data objects, said repair data packets are generated from said data objects by forward error correction encoding, and said forward error correction encoding has the property that only a sub-set of all transmitted data packets that are related to one data object have to be correctly received by a receiver in order to be able to reconstruct said data object, and said network element comprises means for determining, at least partially based on said signaled repair information, how many repair data packets need to be transmitted to said specific receiver in order to enable it to reconstruct said data object, means for generating said repair data packets, and means for transmitting said repair data packets at least to said specific receiver.

According to a further preferred embodiment of the network element of the present invention, said transmitted data packets are related to data objects, and said network element further comprises means arranged for generating said repair data packets from said data objects by forward error correction encoding.

It is further proposed a receiver in a system capable of point-to-multipoint transmission, comprising means arranged for receiving one or more data packets that are transmitted from a transmitter to one or more receivers, wherein at least at said receiver, a reception of repair data packets is required, and means for signaling repair information to a repair server in order to trigger a transmission of said repair data packets, wherein said repair information comprises information related to the number of transmitted data packets correctly received at said receiver.

It is further proposed a software application executable in a receiver of a system capable of point-to-multipoint transmission, the software application comprising program code for causing the receiver to receive one or more data packets that are transmitted from a transmitter to one or more receivers, wherein at least at said receiver, a reception of repair data packets is required; and program code for causing the receiver to signal repair information to a repair server in order to trigger a transmission of said repair data packets, wherein said repair information comprises information related to the number of transmitted data packets correctly received at said receiver.

The software application may also be a computer program product, comprising program code that is stored on a medium, as for instance a memory.

These and other aspects of the invention will be apparent from and elucidated with reference to the embodiments described hereinafter.

DETAILED DESCRIPTION OF THE INVENTION

As an initial remark, it should be noted that the subject-matter of the introductory part of this patent application may be used to support this detailed description.

The present invention proposes that information related to the number of data packets that are correctly received at a specific receiver in a point-to-multipoint data packet transmission system is signaled back to a repair server to trigger the transmission or repair data packets that are required by said specific receiver. This allows for a particularly efficient feed-back of information that enables the repair server to determine which repair data packets need to be transmitted to said specific receiver. This approach is particularly beneficial when said data packets are generated by FEC encoding of transport objects via rate-less codes such as LT codes or raptor codes.

Figure 1:
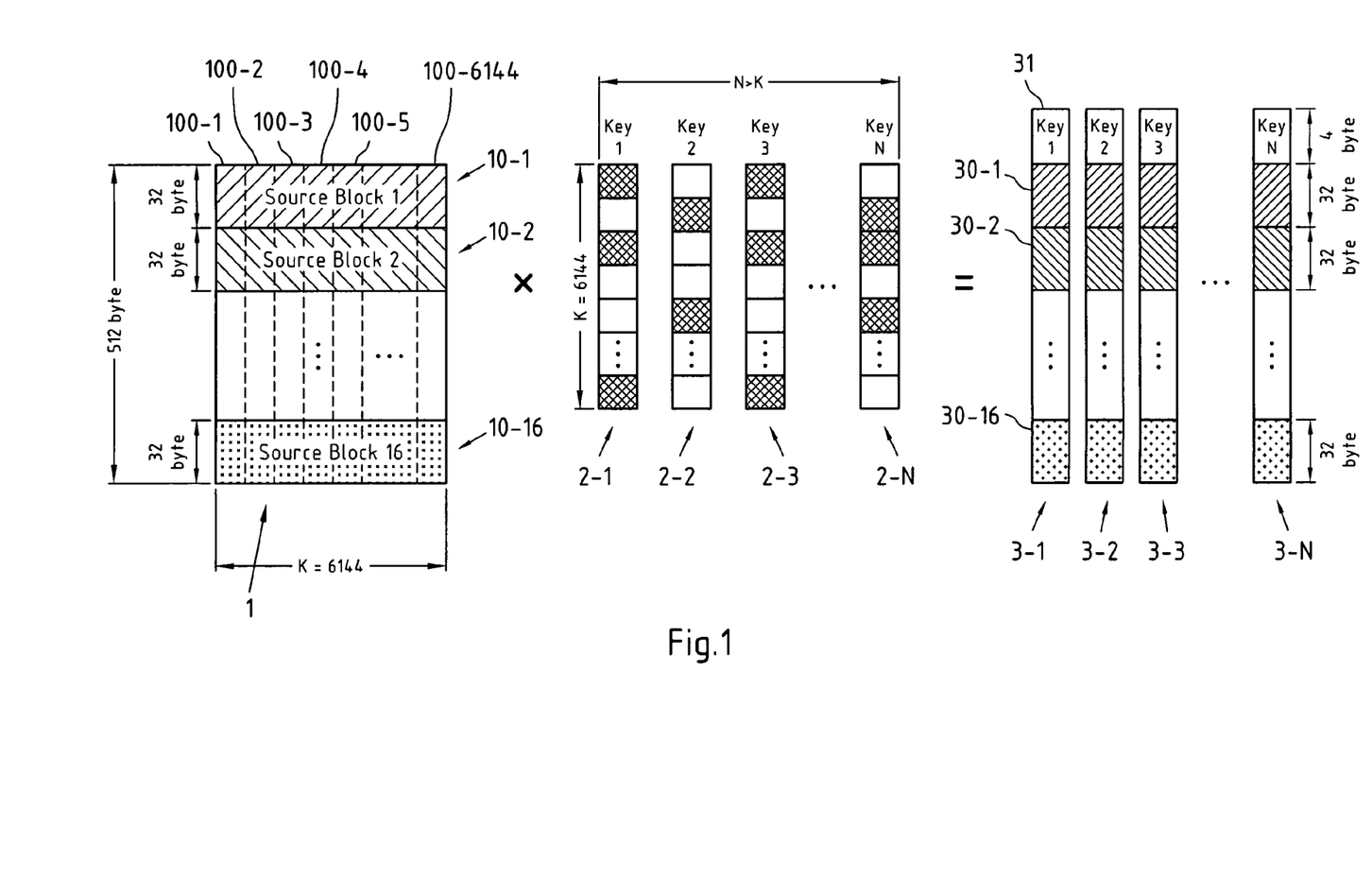
FIG. 1: A schematic illustration of the encoding of a transport object into a series of data packets according to the Raptor code specification for MBMS file download.

FIG. 1 schematically depicts the FEC encoding of a transport object 1 of size 3 MB (a typical size for MBMS file downloads) into a sequence of N encoding packets 3-1 ... 3-N under usage of N encoding keys 2-1 ... 2-N, wherein this FEC encoding corresponds to the Raptor code specification for MBMS file download (see 3GPP publication Tdoc S4-040230 "Raptor Code Specification for MBMS file download", SA4 #31, Montreal, Canada, May 17-21, 2004). Parts of the encoding packets 3-1 ... 3-N obtained by said FEC encoding (in particular, one or more of the encoding symbols 30-$i$) may then for instance serve as payload for FLUTE data packets, as will be discussed in more detail below.

The transport object 1 in FIG. 1, which can be identified by a TOI, represents only one of a plurality of transport objects that is transmitted from a transmitter to a plurality of receivers within a transmission session, which is identified by a TSI. According to FIG. 1, the transport object 1 is composed of 16 source blocks 10-1 ... 10-16, wherein each of these source blocks is composed of K=6144 32-byte source symbols, which are exemplarily labeled for source block 10-1 as 100-1 ... 100-6144. Each source block 10-1 ... 10-16 has a size of 32 bytes times 6144.

FEC encoding of this entire transport object 1 is achieved by matrix multiplication of the transport object 1 with a K×N matrix the columns of which are composed of 6144×1 binary encoding keys, wherein a "1" of an encoding key is schematically depicted as black area and a "0" is schematically depicted as white area. Said N different encoding keys may for instance represent binary pseudo-random codes, but may equally well be more deliberately chosen.

Said number N of used encoding keys is larger than K and determines the receiver overhead. With increasing N, the probability of correct reconstruction of the transport object 1 from the set of encoding symbols 3-1 ... 3-N increases.

By performing the above-described matrix multiplication, the N encoding packets 3-1 ... 3-N are obtained, wherein each encoding packet is of dimension 512 bytes. It can be readily seen from the different shadings applied in the encoding packets, that each encoding packet is composed of 16 encoding symbols, respectively, e.g. encoding packets 30-1 ... 30-16 for encoding symbol 3-1. It can also be seen that encoding symbol 30-1 is influenced by all elements of source block 10-1, but only by encoding key 2-1. Similarly, encoding symbol 30-2 is influenced by all elements of source block 10-2 and encoding key 2-1. Therefore, encoding key 2-1 is included as key 31 into encoding packet 3-1, and similarly, the other encoding keys 2-1 ... 2-N are included into the N encoding packets 3-2 ... 3-N, respectively. Therein, including does not necessarily mean that the entire binary keys as depicted in FIG. 1 are included into the encoding packets. It is more efficient to identify the respective encoding key 2-1 ... 2-N by a respective 4 byte identification, which, for encoding packet 3-1, is exemplarily illustrated as key 31 in FIG. 1. Said identification may for instance relate to the states of a shift register that is suited to create the required encoding key, or similar.

The fact that each encoding packet 3-$i$ only depends on one encoding key 2-$i$ should not cause the impression that a decoupled decoding of an entire source block based on a single encoding packet would be possible. In fact, as can be seen from FIG. 1, the information of one source block 10-$i$ is contained in the respective encoding symbols of all encoding packets 3-1 ... 3-N. To properly decode a source block 10-$i$, due to the properties of rate-less codes, at least K encoding packets have to be processed. The processing of more than K, for instance all N encoding symbols, improves the quality of the decoding. It is also readily seen that, when enough (more than K) encoding packets are available for decoding, not only one source block 10-$i$, but all source blocks 10-1 ... 10-16 can be decoded. Thus when more than K encoding packets are available for decoding, the entire transport object 1 can be reconstructed.

This principle is exploited when using rate-less codes on lossy transmission channels. When a transport object, the source blocks of which are composed of K source symbols each as depicted in FIG. 1, is encoded into N encoding packets, the receiver does not necessarily have to receive all N encoding packets correctly to be able to reconstruct the transport object 1. Furthermore, not even a certain sequence of the reception of the encoding packets, or a reception of a temporally adjacent block of encoding packets is required, because the information in the encoding key, which is also included in each encoding packet, is sufficient to exploit the received data packet for the decoding of the transport object.

To assure that enough encoding packets are available at a receiver, it is thus sufficient, as proposed by the present invention, to signal the number of correctly received data packets, which corresponds to the number of correctly received encoding packets (as each data packet contains one encoding packet as payload in this case), to a repair server which then takes care of the generation of further encoding packets (repair data packets) that, after their correct reception, enable the receiver to decode said transport object. Said repair request information, composed at least of said number of correctly received data packets (corresponding to the number of correctly received encoding packets in this case), advantageously further comprises the TSI and the TOI, to allow identification of the transport session and, if there are several transport objects, of the transport object for which repair data packets are required. In addition, the repair request may also include the IP address of the transmitter. This may be required because the same server may act as a preferred repair server for multiple transmitters. In such a case, the repair request may have to mention the IP address of the transmitter also. Thus the IP address of the transmitter and the TSI uniquely identify a session.

In FIG. 1, the entire transport block 1 is segmented into source blocks 10-1 ... 10-10, which are jointly encoded using the same encoding keys 2-1 ... 2-N to obtain the encoding packets 3-1 ... 3-N. It is understood that, if each FLUTE data packet contains an entire encoding packet 3-$i$, also complete encoding packets 3-$i$ have to be generated by the repair server in case of a repair request of the specific receiver due to missing data packets. However, the segmentation of the transport block into source blocks may be advantageous in order to facilitate decoding with small fast memory at the receiver's decoder, i.e. the receiver's fast memory then only needs to hold the encoding symbols corresponding to one source block at a time. Moreover, the decoder may repeat the same steps in recovering each source block, because it then decodes from encoding symbols that share exactly the same positions in the received sequence.

In contrast, if each FLUTE data packet contains an encoding symbol (for instance 30-1 in FIG. 1) out of each encoding packet (for instance 3-1 in FIG. 1) only, in case of a missing data packet, only a repair data packet containing an encoding symbol instead of an entire encoding packet has to be generated. However, this may require the additional indication of the SBN in the FEC Payload ID of each FLUTE data packet in order to be able to identify the source block the encoding symbol relates to. Each FLUTE data packet header then for instance contains a TSI, TOI, SBN, and a key identifier, and in case of loss or incorrect reception of a FLUTE data packet, in addition to the number of already correctly received FLUTE data packets, the specific receiver further may have to include the SBN of the source block of the transport object the encoding symbol in the lost data packet refers to. The repair server then only generates new encoding symbols for the source block as indicated in the repair information by the SBN.

If the source file is so large that it does not fit into the composite-source-block structure shown in FIG. 1, then it may be necessary to segment the source file into more than one composite-source-block structure. In that case, the repair request may have to include the composite-source-block structure ID also. Each FLUTE data packet header then for instance may contain a TSI, TOI, Composite-SBN, and a key identifier, and in case of loss or incorrect reception of a FLUTE data packet, in addition to the number of already correctly received FLUTE data packets (which corresponds to the number of correctly received encoding symbols in this case), the specific receiver further may have to include the Composite-SBN of the source block of the transport object the encoding symbol in the lost FLUTE data packet refers to. The repair server then may only generate new encoding symbols for the composite-source-block as indicated in the repair request by the Composite-SBN.

Both above mentioned possibilities of incorporating either the encoding symbols of an entire encoding packet or only single encoding symbols into FLUTE data packets are targeted by the present invention.

Figure 2A:
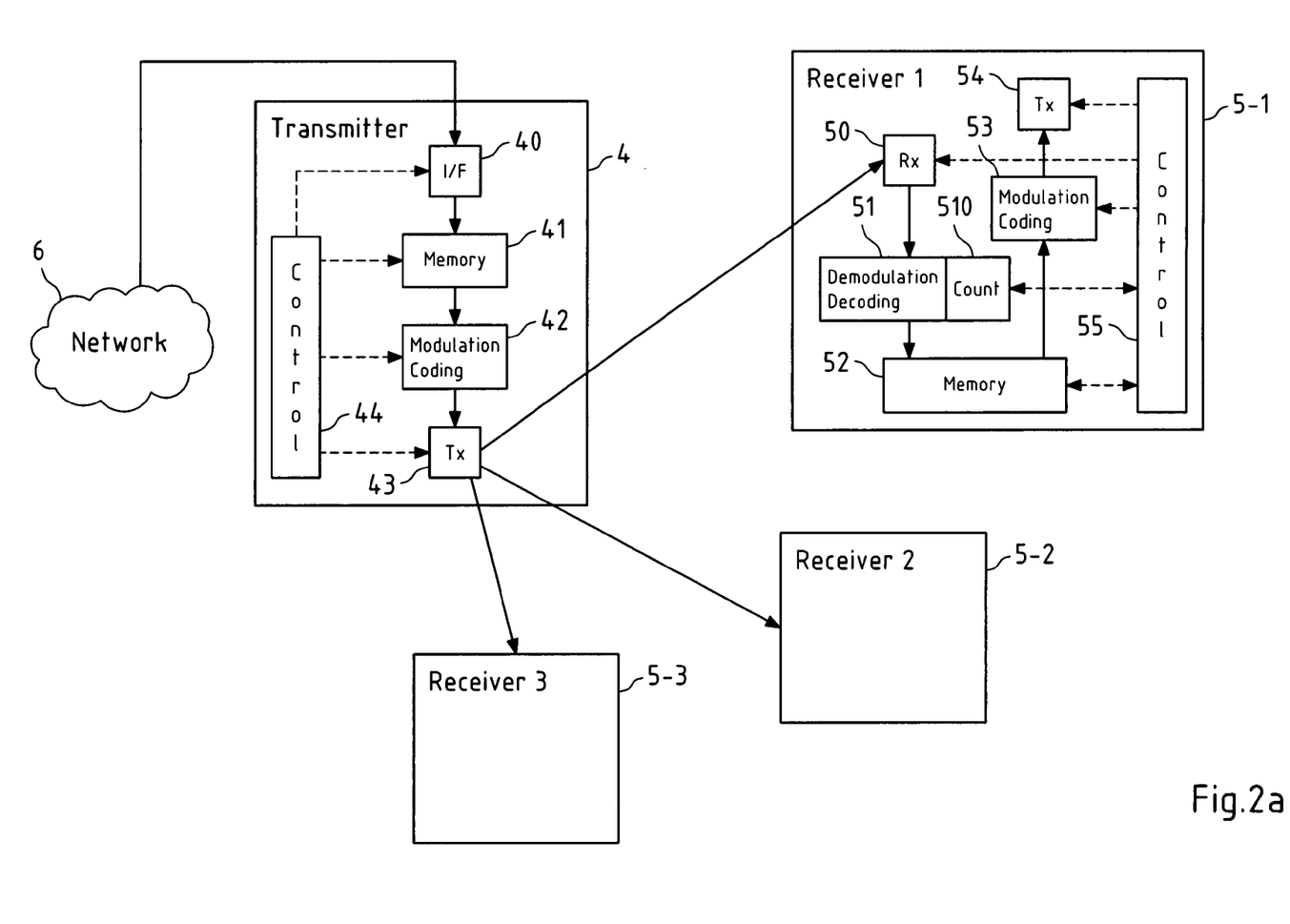
FIG. 2a: a schematic presentation of a point-to-multipoint system according to the present invention, wherein data packets are transmitted from a transmitter to a plurality of receivers.

FIG. 2a gives an overview on the functional components of a transmitter 4 and a receiver 5-1 in a point-to-multipoint transmission scenario where FLUTE data packets (carrying all encoding symbols of an encoding packet or only a single encoding symbol as payload as discussed above) are transmitted to a plurality of receivers 5-1 . . . 5-3.

The transmitter 4 comprises an interface 40 to a network 6, for instance the Internet, and thus has access to content that is provided by that network and that is to be distributed to said receivers 5-1 . . . 5-3 in a broadcast/multicast session. Such content then may for instance be stored in the memory 41 of said transmitter. In order to be able to transmit said content, coding and modulation of said content is performed by a modulation and coding instance 42. The operations performed by said instance 42 fulfill the requirements imposed by the different protocol layers of the ISO/OSI protocol stack. In particular, the generation of FLUTE data packets based on FEC encoding of transport objects to obtain encoding symbols as payload (either one ore several per data packet) of the FLUTE data packets and the definition of the header fields of the FLUTE data packets, containing for instance the TSI, TOI and FEC Payload ID (in the present case of rate-less FEC encoding corresponding to a 4 byte key identifier and possibly an SBN), are performed in this instance 42. Instance 42 then outputs modulated signals that are transmitted by instance 43, which acts as an interface to the wireless or wire-bound (e.g. optical) transmission channel. All instances 40, 41, 42 and 43 of transmitter 4 are controlled by a control unit 44.

At receiver 5-1, which is considered as specific receiver here, the modulated signals are received via an instance 50, and then fed into a demodulation and decoding instance 51 that functionally corresponds to the coding and modulation instance 42 of transmitter 4. In particular, the modulated signals are demodulated, and its is checked whether FLUTE data packets are correctly received or not. This may for instance be accomplished by protocol layers below the FLUTE layer by means of a checksum or similar techniques. If it is decided that a FLUTE data packet was received correctly, a counter 510 in said instance 51 is increased. Said demodulation and decoding instance 51 also serves as a buffer for received FLUTE data packets and, if enough FLUTE packets have been received, performs the decoding of the FLUTE data packets to reconstruct the desired transport object, which then may be stored in memory 52 of receiver 5-1. Said receiver 5-1 further comprises a modulation and coding instance 53 with similar functionality as the modulation and coding instance 42 of transmitter 4, and an instance 54 that acts as an interface to the transmission channel. All instances 50, 51, 52, 53 and 54 are controlled by a control instance 55.

Figure 2B:
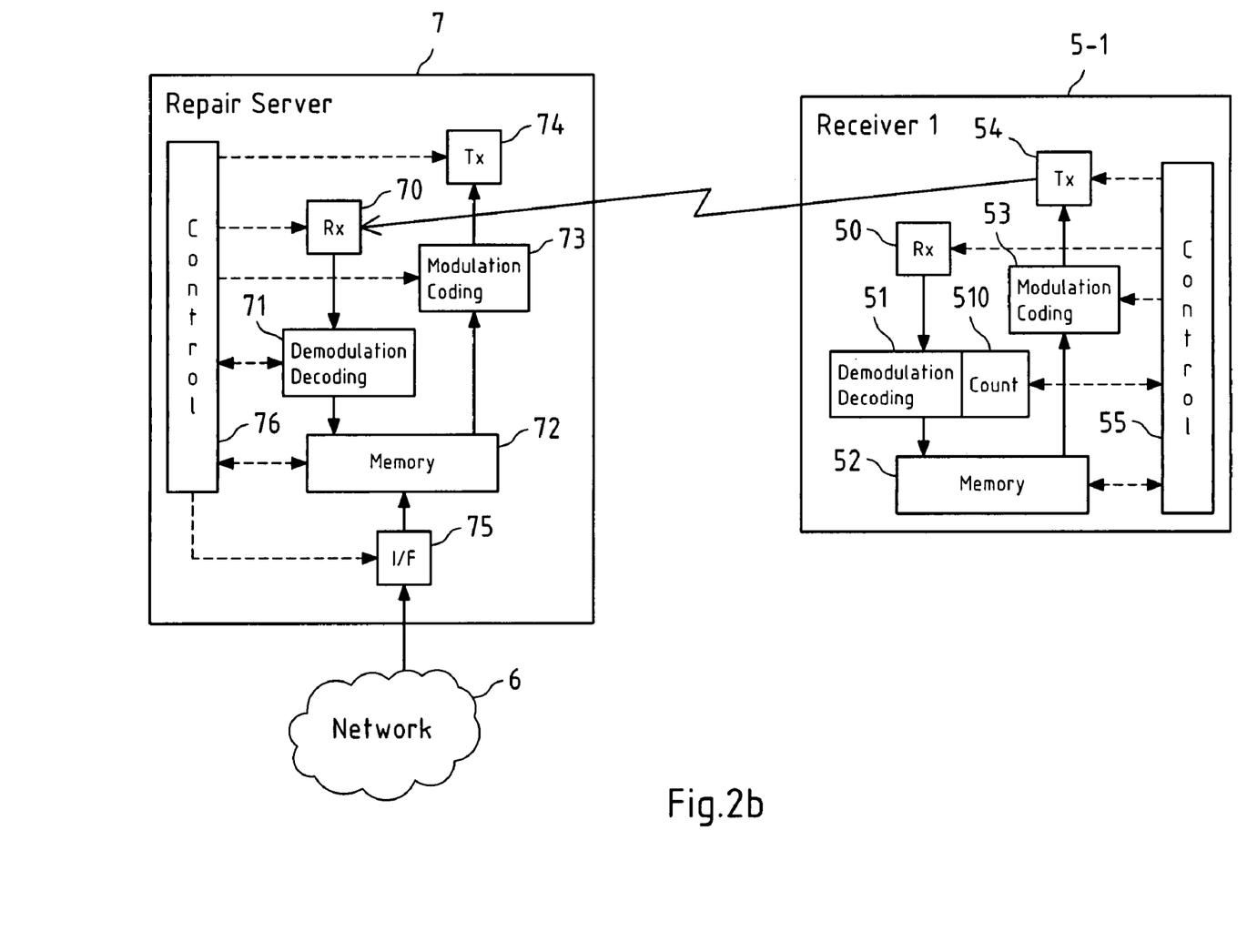
FIG. 2b: a schematic presentation of a point-to-multipoint system according to the present invention, wherein a specific receiver signals back repair information to a repair server.

FIG. 2b illustrates the point-to-point repair session that is established between a repair server 7 and the specific receiver 5-1 during or after the transmission of data packets as depicted in FIG. 2a has been finished. To this end, the receiver 5-1 checks the counter 510 to determine if enough FLUTE data packets have been received to reconstruct the transport object. If this is not the case, the controller 55 causes the generation of a repair request message (similar to a NACK message) by the modulation and coding instance 53, which contains repair information, for instance the TSI, the TOI, the number of correctly received data packets as counted by said counter 510 and possibly an SBN. The generation of said repair request message may use an at least partially different protocol stack as the protocol stack that is used for said point-to-multipoint transmission, for instance HTTP may be used. Said repair request message then may for instance take the following shape:

GET http://www.website.com/greatmusic/number1.mp3?mbms-rel6-FLUTE repair&TSI=123&TOI=456&NumRxedPkts=5432 HTTP/1.1

In this GET message, the repair server, the TSI (123), TOI (456) and the number of correctly received data packets (5432) are contained as repair information. The IP address (or URL) of the MBMS server (transmitter) could also be included in the repair request message.

Alternatively, other HTTP methods such as POST could be used to request the missing data packets. For example, the following POST message is equivalent to the GET message shown above.

POST http://www.website.com/greatmusic/ HTTP/1.1
From: subscriber10@provider.com
Content-Type: application/x-www-form-url-encoded
Content-Length: 56
number1.mp3&mbms-rel6-FLUTE-repair&TSI=123&TOI=456& NumRxedPkts=5432

This repair request message then is transmitted via instance 54 to the repair server 7, wherein it is received via instances 70, demodulated and decoded in instance 71, which provides reverse functionality to instance 53 in the specific receiver 5-1 and, if necessary, is stored in memory 72. Said repair server 7 further comprises a modulation and coding instance 73, a transmission instance 74 and an interface 75 to a network 6. All instances of the repair server are controlled by a control instance 76.

Figure 2C:
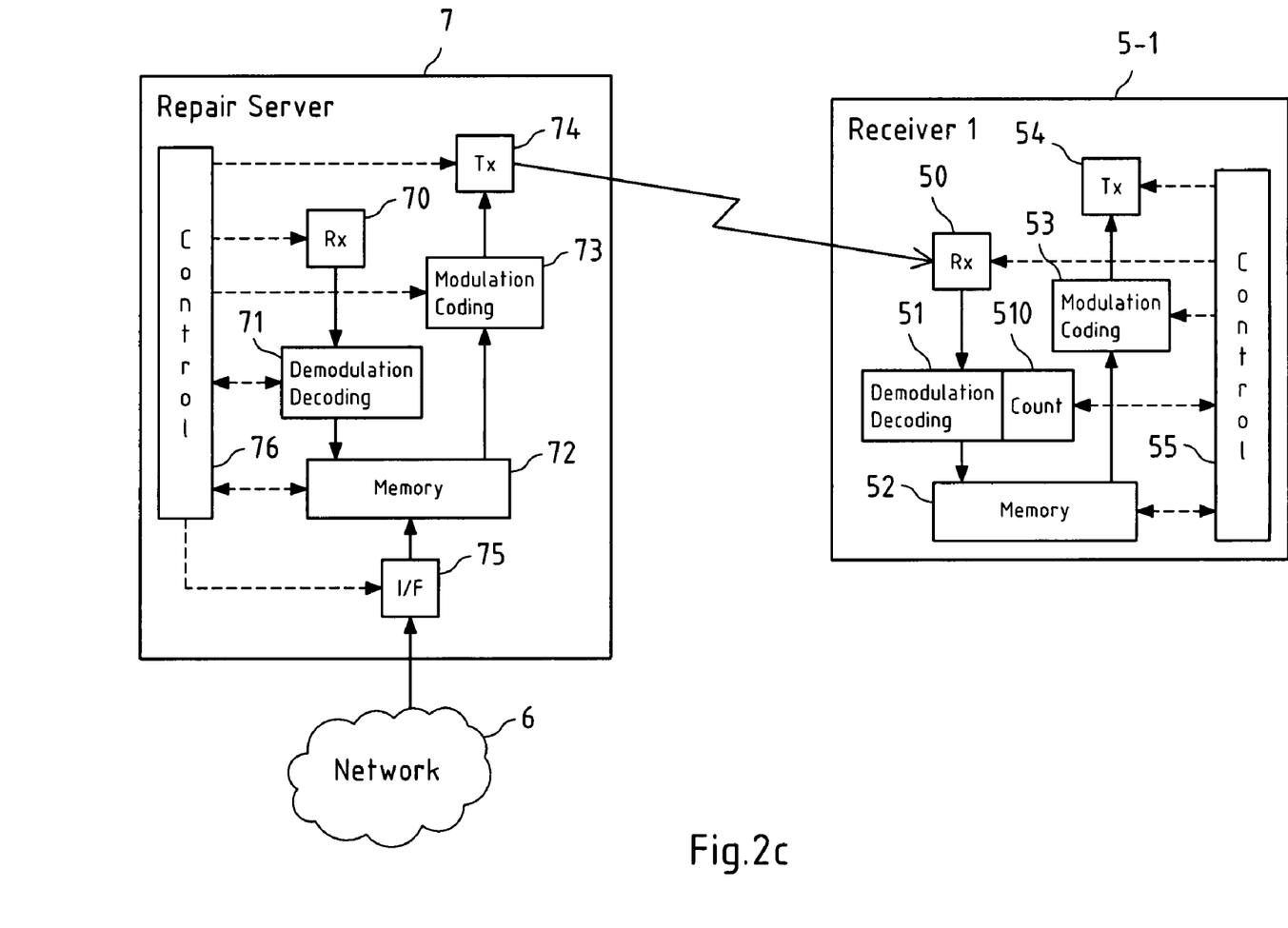
FIG. 2c: a schematic presentation of a point-to-multipoint system according to the present invention, wherein a repair server transmits repair data packets to a specific receiver.

Finally, FIG. 2c depicts the scenario when the repair server 7 transmits FLUTE repair data packets to said specific receiver 5-1 in response to said repair request message sent in FIG. 2b. To this end, repair server evaluates the repair information received from the specific receiver 5-1 via HTTP, and determines how many data packets need to be generated and transmitted to said specific receiver to enable it to reconstruct said transport object. The repair server 7 fetches said transport object or portions thereof either from its memory or, via the interface 75, from the network 6, and performs an FEC encoding on said transport object or parts thereof as illustrated in FIG. 1 to obtain the encoding symbols that serve as payload for the FLUTE repair data packets, wherein either one or several encoding symbols may be used as payload for the data packets. The repair server 7 may for instance determine the number M of FLUTE repair data packets for each (TSI, TOI and possibly SBN) object based on the number of columns of the transport object 1 (variable K in FIG. 1), the reception overhead, and the number of correctly received FLUTE data packets as signaled by the specific receiver in its repair request message. Then the repair server 7 generates a set of M keys and generates the corresponding encoding symbols, which are then embedded into FLUTE repair data packets (either as one or several encoding symbols), modulated and transmitted to said specific receiver 5-1 via instances 73 and 74.

At said receiver 5-1, the modulated signals containing the FLUTE repair data packets are then received via instance 50 and then processed in instance 51 to determine if a data packet has been correctly received or not. If enough FLUTE data packets or repair data packets have been correctly received, the transport object can be reconstructed by said instance 51 and stored in said memory 52 for further processing.

Figure 3:
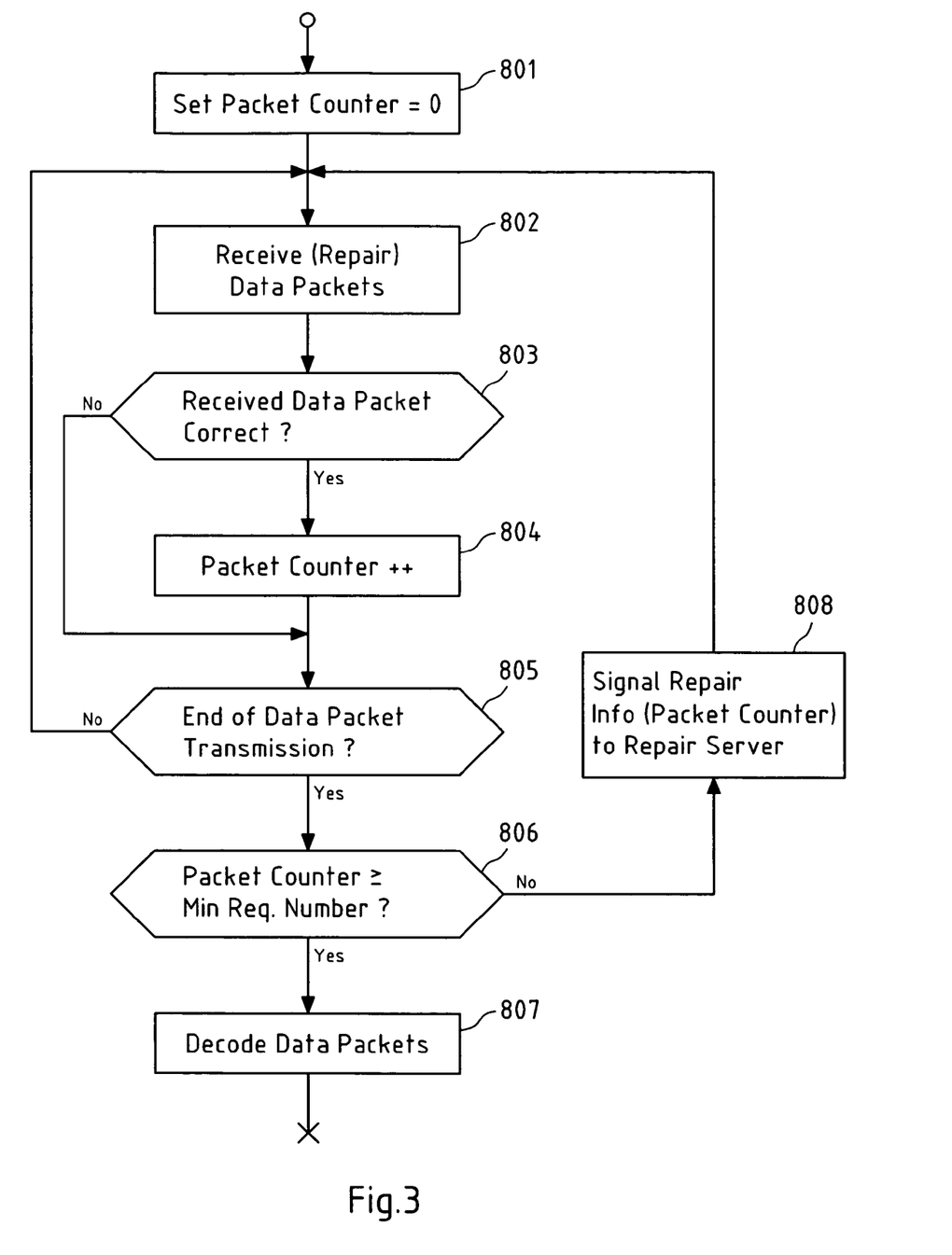
FIG. 3: an exemplary flowchart of a method for receiving data packets and repair data packets in a point-to-multipoint system according to the present invention.

FIG. 3 depicts an exemplary flowchart of a method for receiving data packets at a receiver in a point-to-multipoint system. In a first step 801, a packet counter is set to zero, for instance in order to start the reception of data packets related to a new transport object. Then data packets as transmitted by a transmitter to a plurality of receivers are received in a step 802. In a Step 803, it is then checked if each single received data packet is correct or not. If this is the case, the packet counter is increased by one, otherwise, the increasing is skipped. It is then checked if the transmission of data packets is finished in a step 805. If this is not the case, the method jumps back to step 802 of receiving data packets. Otherwise, it is checked in a step 806 if enough data packets have been received by comparing if the packet counter is equal to or larger than a minimum required number of data packets. If this is the case, the received data packets are decoded to obtain the desired transport object in a step 807. If this is not the case, a repair session has to be initiated by signaling repair information, at least comprising the packet counter and possibly an SBN, and advantageously further comprising a TSI and TOI, within a repair request message to a repair server. The repair server then starts to transmit repair data packets based on said signaled repair information, so that the receiver jumps back to step 802 of receiving repair data packets. This proceeding is continued until enough data packets have been correctly received at said receiver, as checked in step 806.

The invention has been described above by means of preferred embodiments. It should be noted that there are alternative ways and variations which are obvious to a skilled person in the art and can be implemented without deviating from the scope and spirit of the appended claims.

What is claimed is:

1. A method comprising:
   receiving one or more data packets transmitted from a transmitter to one or more receivers; and
   signaling repair information from at least one specific receiver of said receivers, at which specific receiver a reception of repair data packets is required, to a repair server in order to trigger a transmission of said repair data packets, wherein said data packets and said repair data packets are generated from a data object by forward error correction encoding, wherein said forward error correction encoding has a property that only a sub-set of all transmitted data packets that are related to said data object have to be correctly received by said specific receiver to be able to reconstruct said data object, and wherein said repair information allows said repair server to determine how many repair data packets need to be transmitted to said specific receiver to enable said specific receiver to reconstruct said data object and does not comprise an identification of the data packets required at said specific receiver.

2. The method according to claim 1, wherein said repair data packets are required due to loss or incorrect reception of at least one of said transmitted data packets at said specific receiver.

3. The method according to claim 1, wherein said repair data packets are required to reconstruct said data object at said specific receiver.

4. The method according to claim 1, wherein said data object is a transport object, and wherein said repair information comprises an identifier of said transport object.

5. The method according to claim 4, wherein said transport object is related to a transport session, and wherein said repair information comprises an identifier of said transport session.

6. The method according to claim 1, wherein said data object is a portion of a transport object, and wherein said repair information comprises an identifier of said portion and an identifier of the corresponding transport object.

7. The method according to claim 1, wherein said repair information comprises a number of transmitted data packets correctly received at said specific receiver.

8. The method according to claim 1, wherein said repair information comprises a number of transmitted data packets not correctly received at said specific receiver.

9. The method according to claim 1, wherein said encoding is at least partially based on encoding keys that are included into said data packets and repair data packets.

10. The method according to claim 1, wherein said forward error correction is at least partially based on an LT code.

11. The method according to claim 1, wherein said forward error correction is at least partially based on a raptor code.

12. The method according to claim 1, wherein said transmission of one or more data packets to one or more receivers is at least partially controlled by a session-based protocol directed to unidirectional point-to-multipoint transfer.

13. The method according to claim 1, wherein said transmission of one or more data packets to one or more receivers is at least partially controlled by the File Delivery Over Unidirectional Transport protocol.

14. The method according to claim 1, wherein said signaling of said repair information is performed in a point-to-point session between said specific receiver and said repair server.

15. The method according to claim 1, wherein said signaling of said repair information is at least partially controlled by the Hypertext Transfer Protocol.

16. The method according to claim 15, wherein the GET or POST methods of the Hypertext Transfer Protocol are used for said signaling of said repair information.

17. The method according to claim 1, wherein said transmission of said repair data packets from said repair server to said specific receiver is performed in a point-to-point session.

18. The method according to claim 1, wherein said method is useable in a Multimedia Broadcast Multicast System according to the standards of the Third Generation Partnership Project.

19. The method according to claim 1, wherein said repair information comprises information related to the number of transmitted data packets correctly received at said specific receiver.

20. An apparatus comprising:
a reception component configured to receive repair information signaled from a receiver, at which receiver a reception of repair data packets is required after reception of one or more data packets transmitted from a transmitter, in order to trigger a transmission of said repair data packets, wherein said data packets and said repair data packets are generated from a data object by forward error correction encoding, wherein said forward error correction encoding has the property that only a sub-set of all transmitted data packets that are related to said data object have to be correctly received by said receiver to be able to reconstruct said data object, and wherein said repair information allows said apparatus to determine how many repair data packets need to be transmitted to said receiver to enable said receiver to reconstruct said data object and does not comprise an identification of the data packets required at said receiver.

21. The apparatus according to claim 20, wherein said apparatus is configured to generate said repair data packets from said data objects by forward error correction encoding.

22. The apparatus according to claims 20, wherein said transmission of said one or more data packets to said receiver is at least partially controlled by the File Delivery Over Unidirectional Transport protocol.

23. The apparatus according to claims 20, wherein said one or more data packets are transmitted in a Multimedia Broadcast Multicast System according to the standards of the Third Generation Partnership Project.

24. The apparatus according to claim 20, wherein said repair information comprises information related to the number of transmitted data packets correctly received at said receiver.

25. A method comprising:
receiving, at a repair server, repair information signaled from a receiver, at which receiver a reception of repair data packets is required after reception of one or more data packets transmitted from a transmitter, in order to trigger a transmission of said repair data packets, wherein said data packets and said repair data packets are generated from a data object by forward error correction encoding, wherein said forward error correction encoding has the property that only a sub-set of all transmitted data packets that are related to said data object have to be correctly received by said receiver to be able to reconstruct said data object, and wherein said repair information allows said repair server to determine how many repair data packets need to be transmitted to said receiver to enable said receiver to reconstruct said data object and does not comprise an identification of the data packets required at said receiver.

26. The method according to claim 25, wherein said transmission of one or more data packets to one or more receivers is at least partially controlled by the File Delivery Over Unidirectional Transport protocol.

27. The method according to claim 25, wherein said one or more data packets are transmitted in a Multimedia Broadcast Multicast System according to the standards of the Third Generation Partnership Project.

28. The method according to claim 25, wherein said repair information comprises information related to the number of transmitted data packets correctly received at said receiver.

29. An apparatus comprising:
means for receiving repair information signaled from receiver, at which receiver a reception of repair data packets is required after reception of one or more data packets transmitted from a transmitter, in order to trigger a transmission of said repair data packets, wherein said data packets and said repair data packets are generated from a data object by forward error correction encoding, wherein said forward error correction encoding has the property that only a sub-set of all transmitted data packets that are related to said data object have to be correctly received by said receiver to be able to reconstruct said data object, and wherein said repair information allows said apparatus to determine how many repair data packets need to be transmitted to said receiver to enable said receiver to reconstruct said data object and does not comprise an identification of the data packets required at said receiver.

* * * * *

UNITED STATES PATENT AND TRADEMARK OFFICE
CERTIFICATE OF CORRECTION

PATENT NO. : 7,590,922 B2　　　　　　　　　　　　　　　　　　　　　Page 1 of 1
APPLICATION NO. : 10/903489
DATED : September 15, 2009
INVENTOR(S) : Vedantham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this

Twenty-first Day of September, 2010

David J. Kappos
*Director of the United States Patent and Trademark Office*